G. L. MUNDIGLER.
TICKET MACHINE FOR CONDUCTORS.
APPLICATION FILED SEPT. 28, 1912.

1,054,983.

Patented Mar. 4, 1913.

4 SHEETS—SHEET 1.

G. L. MUNDIGLER.
TICKET MACHINE FOR CONDUCTORS.
APPLICATION FILED SEPT. 28, 1912.

1,054,983.

Patented Mar. 4, 1913.
4 SHEETS—SHEET 2.

G. L. MUNDIGLER.
TICKET MACHINE FOR CONDUCTORS.
APPLICATION FILED SEPT. 28, 1912.

1,054,983.

Patented Mar. 4, 1913.

G. L. MUNDIGLER.
TICKET MACHINE FOR CONDUCTORS.
APPLICATION FILED SEPT. 28, 1912.

1,054,983.

Patented Mar. 4, 1913.
4 SHEETS—SHEET 4.

UNITED STATES PATENT OFFICE.

GEORGE L. MUNDIGLER, OF WEST ALLIS, WISCONSIN, ASSIGNOR TO THOMAS G. TOLLEFSON AND VEGO M. WEST, BOTH OF WEST ALLIS, WISCONSIN.

TICKET-MACHINE FOR CONDUCTORS.

1,054,983.   Specification of Letters Patent.   Patented Mar. 4, 1913.

Application filed September 28, 1912. Serial No. 722,952.

*To all whom it may concern:*

Be it known that I, GEORGE L. MUNDIGLER, a citizen of the United States, and resident of West Allis, in the county of Milwaukee and State of Wisconsin, have invented certain new and useful Improvements in Ticket-Machines for Conductors; and I do hereby declare that the following is a full, clear, and exact description thereof.

My invention has for its object to provide a simple, effective and durable machine for expediting the duties of conductors of public conveyances such as for example making change in the collection of fares and especially in dispensing transfer tickets, the invention consisting in certain peculiarities of construction and combination of parts as set forth hereinafter with reference to the accompanying illustrations and subsequently claimed.

Figure 1:
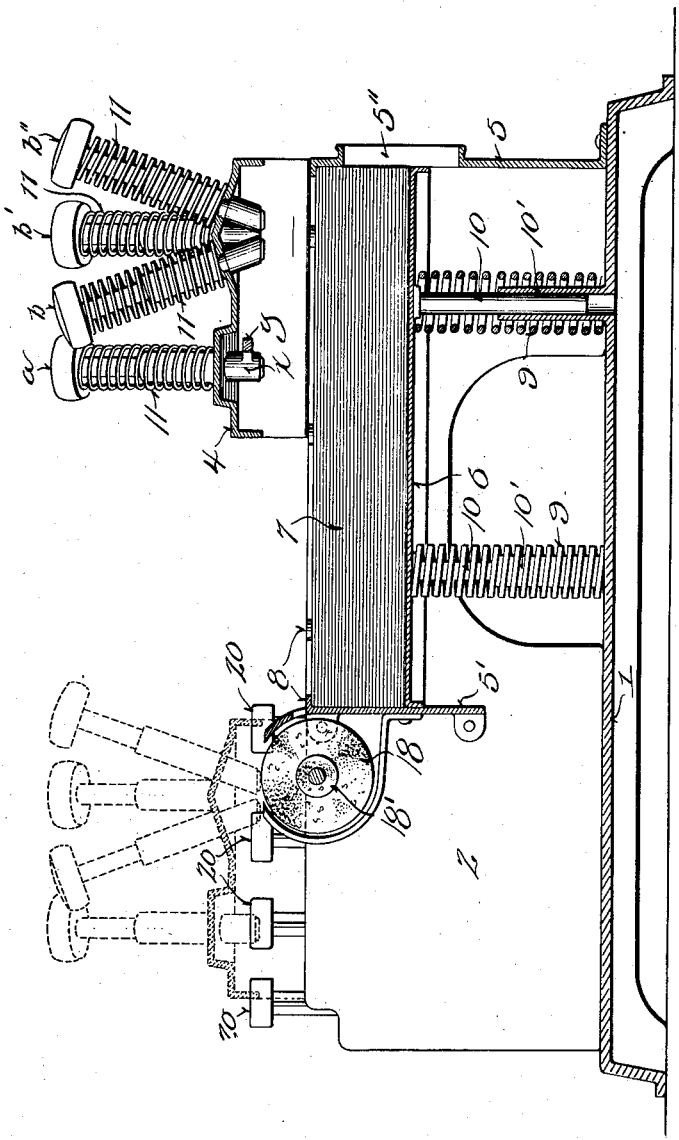
Figure 2:
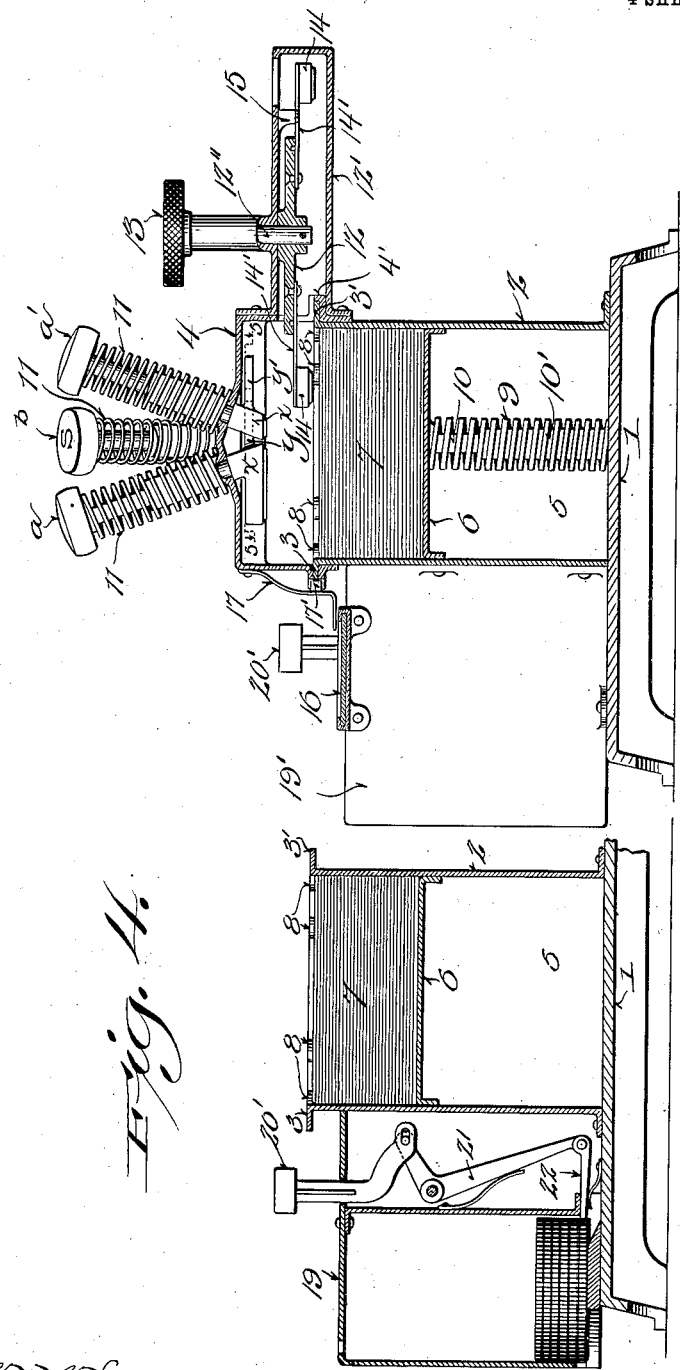
Figure 3:
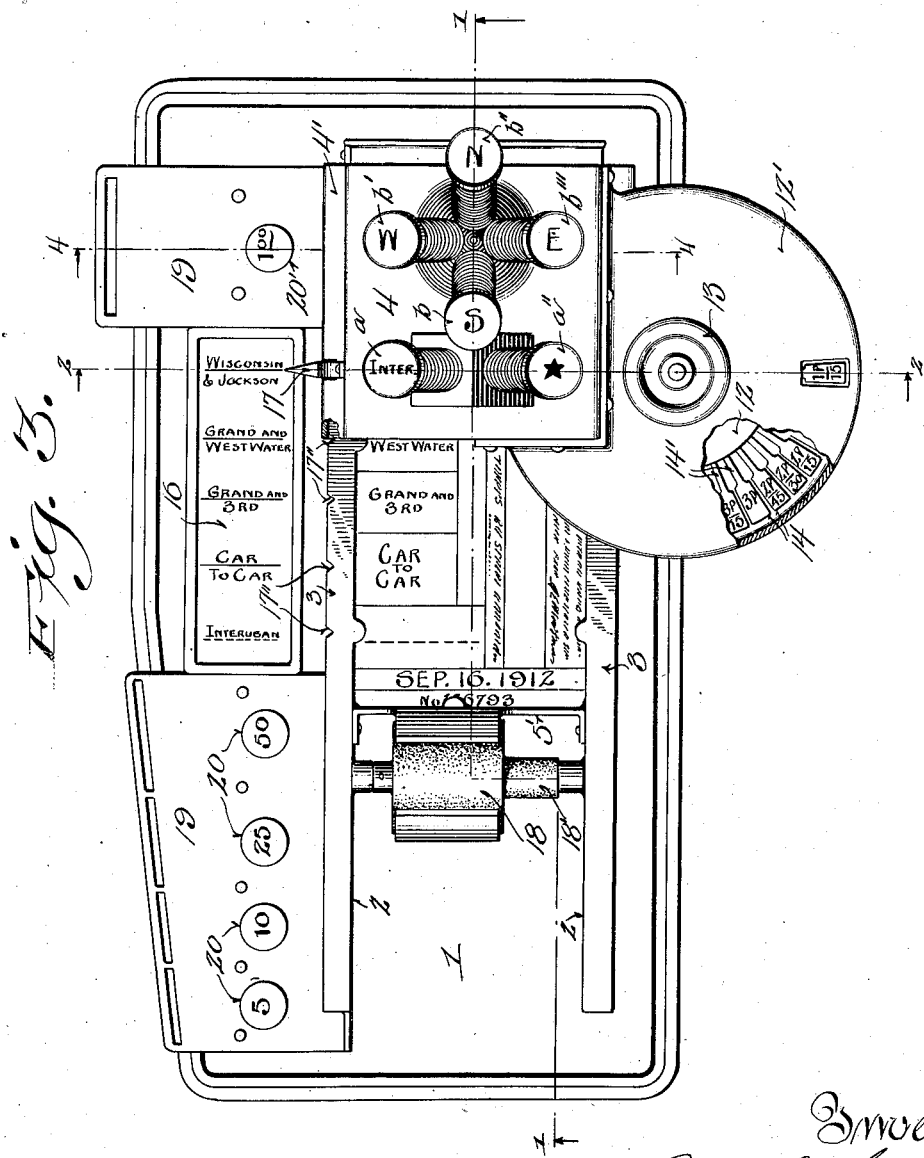
Figure 5:
Figure 6:
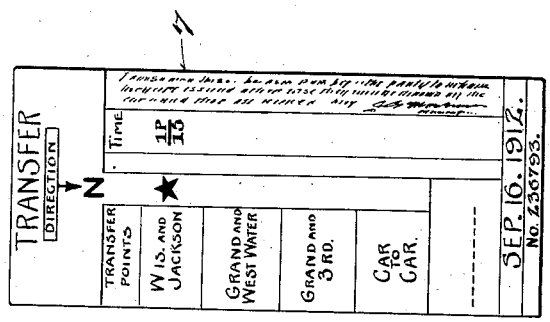

In the drawings Figure 1 represents a longitudinal sectional elevation of a machine embodying the features of my invention, the section being indicated by line 1—1 of Fig. 3; Fig. 2, a cross-section of the same as indicated by line 2—2 of Fig. 3; Fig. 3, a plan view of said machine with parts broken away and in section to illustrate certain structural features; Fig. 4, another cross-section of the machine, the section being taken upon a line as indicated by line 4—4 of Fig. 3 with the shiftable key-board moved to another position from that shown in Fig. 3, out of the line of said section; Fig. 5, a detailed cross-section of certain of the type blocks, the section being indicated by line 5—5 of Fig. 2, and Fig. 6, a face view of a printed form of a transfer, the same being shown completed by stamping the time, place and indicated direction thereon.

Referring by characters to the drawings, 1 represents a bed-plate upon which is mounted a rectangular casing 2, the side walls of the same being flanged outwardly to form rails 3 and 3' for the reception of a slidable key-board 4, the depending walls of which key-board are provided with offset grooved flanges 4' that engage the rails 3. The casing is closed at one end by a plate 5, the opposite end being provided with a transverse partition plate 5', between which plates and the side walls of said casing there is interposed a vertically movable table 6 for the reception of a stack of printed forms 7, the same constituting transfer tickets.

The uppermost form of the stack is arranged to engage a series of nibs 8 that are inwardly extended from the end and side plates of the casing, the entire group of forms being forced upwardly by coiled springs 9 which are interposed between the bed-plate and lower face of the table. These coiled springs surround plungers 10 that depend from the table, which plungers are in telescopic engagement with sleeves 10' that project upwardly from the bed-plate.

It is apparent from the foregoing description that the uppermost printed form of the series can be readily stripped from the nibs that retain the latter if desired, for use, and that the coiled springs will automatically feed the stack upwardly as it is depleted and when said stack has been exhausted the table may be depressed and a similar stack placed thereon by inserting the same through a suitable aperture 5'' with which the end plate 5 is provided.

The shiftable key-board 4, as shown, is provided with two independent groups of spring actuated keys $a$, $a'$, and $b$, $b'$, $b''$, $b'''$, respectively, there being two keys in one of the groups and four in the remaining group, as best shown in the plan view Fig. 3. The stems of all of the keys are suitably guided in thimbles which extend from the face of the key-board, the said keys being held in their normal position by coiled springs 11, which coiled springs are interposed between said key-board face and the lower face of the heads of said keys.

It is apparent by reference to the drawings that the separate groups of keys are each arranged to be brought to a common printing point and that all of said keys are provided with suitable type blocks, those shown in connection with keys $a$ and $a'$ being indicated by $x$, $x'$, it being understood that the other group of keys referred to are similarly provided with such type blocks. The type block $x'$ carries a star which is adapted to print upon the form therebelow, whereby the point of transfer may be indicated and the corresponding type block $x$ is, as shown, provided with type to indicate interurban and will print the same upon the form to indicate a transfer to such cars of the system. It is understood however that one of these keys or both may be provided with any suitable symbolic type character, conforming to the requirements of the railway system to which the apparatus may be applied.

The second group of type-carrying keys are, as indicated by the plan view, provided with type-blocks having characters thereon indicating North, South, East and West, all of which print upon a common printing point upon the form, whereby the direction of transfer is indicated.

To properly record the time of transfer upon the uppermost blank contained in the casing, I provide a type-wheel 12, which type-wheel is mounted within a housing 12' that extends from one side of the key-board, the type-wheel being provided with a spindle 12" that is journaled in a sleeve of the housing and has secured to its upper end a button 13 whereby the wheel may be revolved. The wheel 12 also carries a series of radially disposed type-blocks 14, which type-blocks are mounted upon the ends of spring fingers 14' that are secured to and extend from the type-wheel, the same being capable of independent movement with relation to each other. The upper face of the spring fingers 14' are provided with characters to indicate the time of transfer, the said type being sufficient in number to complete an interval of twelve hours in divisions of fifteen minutes or forty-eight in all and, for example, if it is desired to print a transfer which expires at fifteen minutes after one p. m., the inscription upon the printing face of the type would be $\frac{1P}{15}$ and this character would show upon the upper face of that spring finger which is diametrically opposite the type character to be printed, the said character being alined with the first group of keys. The housing 12', for the purpose of visibly adjusting the type-wheel, is provided with an aperture in its face whereby the indicating characters upon the type members can be seen, and hence the operator revolves the type wheel until the proper characters register with said aperture, whereby the corresponding type is brought into position for printing and held in such position by a spring dog 15 which depends from the casing and is adapted to center between the spring fingers 14 to thus hold the wheel in its adjusted position. Printing of the time upon the transfer form is obtained through manipulation of either of the first group of type keys $a$, $a'$. This is accomplished through spurs $y$, $y'$, that project from the type blocks $x$ and $x'$, which spurs are adapted to engage the alined type block of the type-wheel. In order to print the various symbols in their respective selected positions with relation to the printed form for the transfers I provide a visible indicator card 16, which is suitably secured to one side of the casing in a position corresponding to the position of the stack of printed forms therein, this card being marked with the points of transfer as shown in Fig. 3. The key-board, as previously described, is slidably mounted upon the rails 3 and 3' and to adjust the same to the proper point of printing the said key-board carries a spring pointer 17 that overlaps the indicator card 16, which pointer carries a tooth 17' that is nested within a recess formed in the adjacent key-board flange 4. The tooth is arranged to engage any one of a series of notches 17" with which the edge of the rail 3 is provided and thus when sliding the key-board to a selected position it is readily centered due to the fact that the tooth 17 of the spring pointer will snap into that notch which is alined with the point of transfer indicated by the card.

After a transfer has been completed by manipulation of the several keys, whereby the proper records are made upon said form, the key-board is shifted to one end of the casing as indicated by dotted lines in Fig. 1, to thus expose the entire face of the completed transfer, which transfer being accessible can then readily be removed by the operator, who, by frictional engagement of the hand, strips said transfer from the stack in such manner as to first draw one end thereof free from the nibs 8. Incidental to the shift of the key-board to the position indicated by dotted lines all of the type-blocks will engage a stepped inking roll 18, a reduced portion 18' being adapted to engage the faces of certain of the type-blocks carried by the type-wheel. It is apparent however that while I have shown this method of inking the type-blocks other means for accomplishing the desired result may be utilized or I may, without departing from the spirit of my invention, utilize the face of the type as cutting or embossing members to thus dispense with inking the same.

It should be also understood that it is within the scope of my invention to vary the number of type-carrying keys in each group or to utilize only a single group.

In order to increase the utility of the machine I also provide a change-making apparatus, which apparatus comprises a series of coin magazines 19, each of which are key-actuated and for convenience in construction in this instance one of the coin magazines is disposed at one end of the casing while I have shown a connected group at the opposite end thereof. The connected group of coin magazines are provided with keys 20 indicating five, ten, twenty-five and fifty cents, the single magazine being provided with a key 20' that indicates one dollar. Each of these keys as shown in Fig. 4 are connected to a spring-controlled bell-crank 21, an arm of which carries an ejector finger 22 that is arranged to engage the lower coin of a stack, each coin of which stack corresponds to the amount indicated upon the face of each key. Hence when it is desired to make change for any amount from a dime to a dollar by manipulating the proper key or combination of keys the amount will be discharged through a bottom mouth with which each of the various magazines are provided, it being understood that the ejector finger can be of such thickness as to engage one or more coins, whereby a predetermined number will be discharged with each operation.

I claim:

1. A machine of the character described comprising the casing, a spring-actuated table mounted in the casing, the same being adapted to receive a stack of printed forms, rails carried by the casing, a key-board in slidable union with the rails, a visible indicator form in connection with the casing, a pointer carried by the key-board for registration with the indicator, means for holding the key-board in selected positions, and groups of spring-actuated type-carrying keys mounted upon the key-board adapted to be impressed upon the uppermost form of the stack contained within the casing.

2. A machine of the character described comprising the casing, a spring-actuated table mounted in the casing, the same being adapted to receive a stack of printed forms, rails carried by the casing, a key-board in slidable union with the rails, a visible indicator form in connection with the casing, a pointer carried by the key-board for registration with the indicator, means for holding the key-board in selected positions, and spring-actuated type-carrying keys mounted upon the key-board adapted to be impressed upon the uppermost form of the stack contained within the casing.

3. A machine of the character described comprising the casing, a spring-actuated table mounted in the casing, the same being adapted to receive a stack of printed forms, rails carried by the casing, a key-board in slidable union with the rails, a visible indicator form in connection with the casing, a pointer carried by the key-board for registration with the indicator, means for holding the key-board in selected positions, and a group of spring-actuated type-carrying keys adapted to be impressed upon the uppermost form of the stack contained within the casing, a wheel in juxtaposition to the group of type-carrying keys, yieldable type carried by the wheel, and means extending from each type-carrying key of the group engageable with a selected type of the wheel.

In testimony that I claim the foregoing I have hereunto set my hand at Milwaukee in the county of Milwaukee and State of Wisconsin in the presence of two witnesses.

GEORGE L. MUNDIGLER.

Witnesses:
GEORGE W. YOUNG,
M. E. DOWNEY.